United States Patent [19]

Hayes, III

[11] Patent Number: 4,800,986

[45] Date of Patent: Jan. 31, 1989

[54] COLLAPSIBLE TOWER FOR ATVS

[76] Inventor: James C. Hayes, III, Rte. 1, Box 104-A, Four Oaks, N.C. 27524

[21] Appl. No.: 162,543

[22] Filed: Mar. 1, 1988

[51] Int. Cl.$^4$ .................... E06C 5/00; A45F 3/26
[52] U.S. Cl. .................... 182/18; 182/116; 182/127
[58] Field of Search ............. 182/127, 152, 116, 117, 182/63, 18

[56] References Cited

U.S. PATENT DOCUMENTS

| | | | |
|---|---|---|---|
| 3,490,558 | 1/1970 | Foley | 182/127 |
| 3,857,460 | 12/1974 | Nini | 182/127 |
| 4,442,919 | 4/1984 | Fulcher | 182/63 |
| 4,493,392 | 1/1985 | Alimbau | 182/27 |
| 4,614,252 | 9/1986 | Tarner | 182/116 |
| 4,625,831 | 12/1986 | Rodgers, Jr. | 182/116 |
| 4,696,374 | 9/1987 | Hale | 182/127 |

Primary Examiner—Reinaldo P. Machado
Attorney, Agent, or Firm—Henderson & Sturm

[57] ABSTRACT

A collapsible tower apparatus (10) for use on an ATV (100); wherein, the tower apparatus (10) comprises a framework unit (11) that is pivotally and reinforceable attached on one end to the front (102) and rear (103) racks of the ATV (100) and wherein the other end of the framework unit is pivotally connected to a platform unit (12) equipped with a seat unit (13); whereby the framework unit (11) in conjunction with the platform unit (12) form a protective cage for the operator of the ATV (100) when the tower apparatus (10) is disposed in its collapsed mode.

7 Claims, 1 Drawing Sheet

COLLAPSIBLE TOWER FOR ATVS

TECHNICAL FIELD

The present invention relates generally to elevated hunting platforms and more specifically to a collapsible tower for all terrain vehicles.

BACKGROUND OF THE INVENTION

This invention was the subject matter of DDP Registration No. 161,056 filed in the U.S. Patent and Trademark Office on Jan. 2, 1987.

As most knowledgeable hunters are aware, tree stands are an extremely effective means by which to hunt deer with either a bow or a firearm.

While many tree stands found throughout the country are of the permanently constructed type, over the last fifteen years or so, the portable and/or self-climbing tree stands have received widespread acceptance by the hunting fraternity.

Coincidence with the introduction of mass produced and relatively inexpensive all terrain vehicles, a hybrid rolling tree stand device has started to make an impact on the commercial market. Examples of some of these hybrid devices may be seen by reference to the following U.S. Pat. Nos. 4,614,252; 4,625,831; and 4,442,919.

While all of the aforementioned rolling tree stand devices are more than adequate for the purpose and function for which they were specifically designed, they are deficient in a number of important respects in that: they either require the presence of a tree as a stabilizing factor in the ATV borne versions; or, they are so bulky as to require a trailer hitch to tow the independent stand or tower behind an ATV or the like.

Obviously in situations wherein the hunter wishes to hunt a corn field or a cut-over timbered area none of the aforementioned prior art devices would be considered to be practical, due to the absence of trees to support the stand, or the inability of the towing vehicle to maneuver through the standing corn or around and over stumps while pulling an independent wheeled tower.

Given the fact that cornfields and recently cut-over areas produce excellent hunting conditions, due to their natural tendency to attract the deer to a readily available and plentiful source of food; it is not surprising that most hunters have found the aforementioned prior art devices to be both impractical and limited in their effective usage. As a consequence there has existed a long standing need for an improved collapsible tower for ATVs that would overcome the deficiencies of the prior art constructions in that the tower could be deployed on any terrain that the ATV alone was capable of negotiating, without the necessity of the proximity of an independent stabilizing object.

BRIEF SUMMARY OF THE INVENTION

The present invention involves a collapsible tower framework; wherein, the tower framework is adapted to be operatively connected at the four corners of an all terrain vehicle in the towers extended mode. In addition, the front and rear legs of the framework are pivotally connected to the four corners of the all terrain vehicle, such that the tower framework will assume a very low profile in the collapsed mode as the ATV is transporting the tower to and from a hunting area.

Furthermore, since the operative connection between the tower and the ATV occurs on the corners of the ATV, the combined structure will have a width that will not exceed the width of the ATV; and, the rear legs of the tower are pivotally connected to the tower platform, such that the operator of the ATV will easily be able to rotatably displace the rear legs of the tower to gain ingress and egress from the ATV.

It will also be appreciated later on in the specification that the collapsible tower construction of this invention will also serve as a roll bar framework for the ATV, particularly in its collapsed mode; wherein, the tower framework forms a protective cage that will envelope the operator and serve to prevent the operator from sustaining serious injuries should the ATV tip over while the combined structure is in transit.

The collapsible tower of this invention also contemplates the provision of a rotatable stool disposed on top of the tower platform; whereby, the hunter will have a comfortable swivel perch once the tower framework has been scaled. In addition, the rotatable stool is further provided with a restraining means that will restrict the free rotation of the stool while the combined apparatus is in transit.

By now it should be appreciated that the ATV supported collapsible tower of this invention provides an elevated platform into a hunting area; wherein, the occupant of the ATV is protected by the tower framework while in transit; and, wherein the tower is not dependent upon the proximity of an independent stabilizing object for support.

BRIEF DESCRIPTION OF THE DRAWINGS

These and other objects, advantages and novel features of the invention will become apparent from the detailed description of the best mode for carrying out the preferred embodiment of the invention which follows, particularly when considered in conjunction with the accompanying drawings; wherein.

BEST MODE FOR CARRYING OUT THE INVENTION

Figure 1:
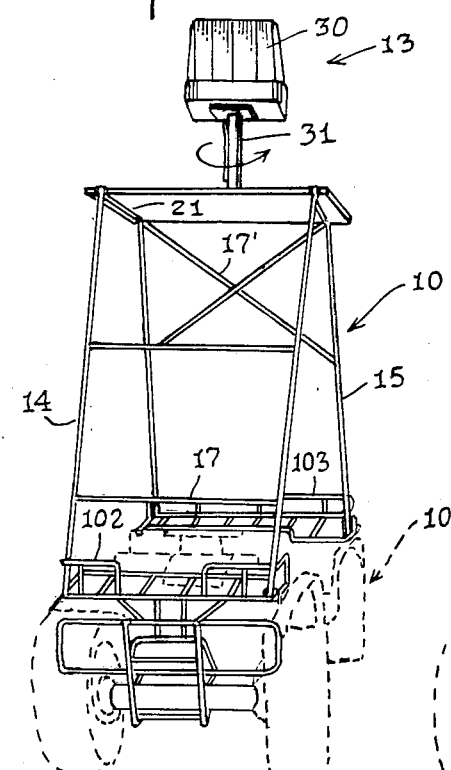
FIG. 1 is a front perspective view of the collapsible tower mounted on an all terrain vehicle in the extended mode.

As can be seen by reference to the drawings and in particular to FIG. 1, this invention comprises the combination of a collapsible tower apparatus designated generally by the reference numeral (10) and an all terrain vehicle designated by reference number (100). The collapsible tower apparatus (10) comprises in general a framework unit (11) a platform unit (12) and a seat unit (13). These units will now be described in seraitim fashion.

Prior to embarking on a description of the collapsible tower apparatus (10) it would be advisable to discuss some of the salient structural components of the ATV (100). As shown in the drawings the tower apparatus (10) of this invention was specifically developed for use with a four wheeled ATV body (101) having front (102) and rear (103) rack members secured to the ATV body (101). These rack members (102)(103) are generally formed from tubular steel segments (104) that are connected together as by welding to form an open cage framework that can be used to support and store diverse pieces of equipment (not shown).

Turning now to the collapsible tower apparatus (10) it can be seen that the framework unit (11) comprises a front (14) and rear (15) framework segment; wherein, the front framework segment (14) comprises a pair of elongated generally tubular leg members (16) that are connected to and spaced from one another by a plurality of generally tubular cross-piece members (17). In addition, the rear framework segment (15) likewise comprises a pair of elongated generally tubular leg members (16') that are connected to, and spaced from one another by a plurality of generally tubular cross-piece members (17').

Figure 2:
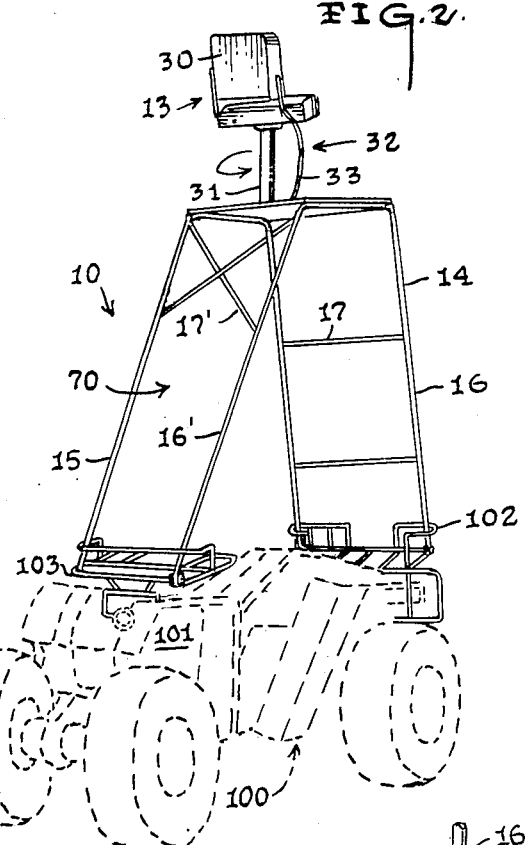
FIG. 2 is a rear perspective view of the tower mounted on an ATV in the extended mode.

As can best be seen by reference to FIGS. 1 and 2, the platform unit (12) comprises a generally flat rectangular platform member (20) having a pair of support elements (21) secured proximate the sides of the bottom (22) of the platform member (20). In the preferred embodiment of this invention the support elements (21) comprise tubular support members (19) which project slightly beyond the front and rear ends of the platform member (20); wherein, the support members (19) are operatively secured to the upper ends of the pairs of leg members (16)(16') of the framework unit (11).

As can also be seen by reference to FIGS. 1 and 2, the seat unit (13) comprises a seat member (30) rotatably disposed on a pedestal element (31); wherein, the base of the pedestal element (31) is fixedly secured to the platform member (20) in a well recognized fashion. In addition, the seat member (30) is provided with a restraining means (32) in the form of a tether element (33); whereby, the seat member (30) may be constrained from rotary movement relative to the platform member (20) while the ATV (100) is in motion.

Figure 3:
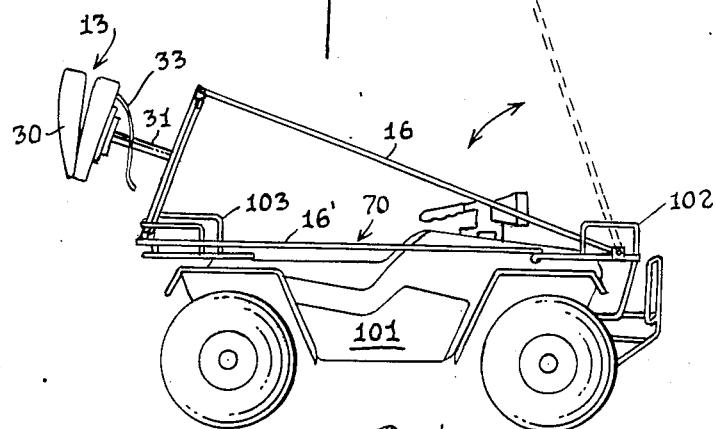
FIG. 3 is a side plan view of the combined apparatus in the collapsed mode.
Figure 4:
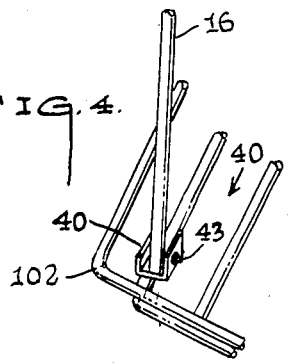
FIGS. 4 and 5 are enlarged detail views of the operative connections between the tower and the ATV; and, FIG. 6 is an enlarged detail view of the connection between the tower framework and platform.
Figure 5:
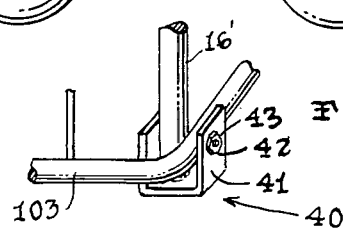

As can best be seen by reference to FIGS. 3 thru 5, the lower portions of the framework leg members (16)(16') are provided with securing members (40) that pivotally secure the leg members (16)(16') to the corners of the front (102) and rear (103) rack members of the ATV (100). In the preferred embodiment of the invention the securing means (40) comprise a generally C-shaped bracket member (41) that is dimensioned to receive any one of the leg members (16)(16') as well as a portion of the rack members (102)(103); wherein, a fastening member (42) such as a threaded nut and bolt arrangement (43) may be used in a well recognized fashion to pivotally secure the leg members (16)(16') to the rack members (102)(103).

Figure 6:
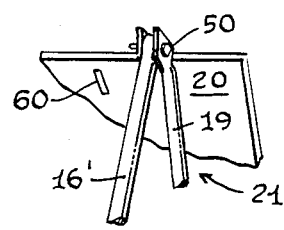

Turning now to FIG. 6, it can be seen that the platform member (20) is operatively secured to the upper portion of the framework unit (11) via a plurality of fastening elements (50) that extend between the tubular support members (19) and the upper portion of the leg members (16)(16'). The fastening elements (50) are further designed to releasably engage the leg members (16)(16') relative to the platform member (20) such that the leg members (16)(16') may be pivoted relative to the ATV body (101) and the platform member (20) to erect and collapse the framework unit (11).

It should also be noted at this junction that this invention also contemplates the use of a level means (60) disposed on the platform member (20); wherein, the operator of the ATV may visually check the level means (60) to adjust the leg members (16)(16') such that the platform member (20) is disposed in a horizontal plane even though the ATV may be parked on a slope or incline.

Referring again to FIGS. 1 thru 3, it can also be seen that the front framework segment (14) is provided with a plurality of horizontally disposed cross-piece members (17) while the rear framework segment (15) is provided with a plurality of intersecting angularly disposed cross-piece members (17'). While the general purpose of the cross-piece members (17)(17') are to provide structural rigidity to the respective framework segments (14) and (15); the horizontally disposed cross-piece members (17) also function as steps, that allow the hunter to gain access to the elevated platform (20) and seat unit (13). In addition, the intersecting cross-piece members (17') on the rear framework segment (15) are disposed proximate the platform member (20), such that the rear framework segment (15) will have an enlarged opening designated as (70) in FIGS. 2 and 3 that will accommodate the operator of the ATV.

As can be particularly appreciated by reference to FIG. 3, the front and rear framework segments (14) and (15) in conjunction with the platform member (20) form a protective cage arrangement that surrounds the operator of the ATV when the tower apparatus (10) is in its collapsed mode. This feature is particularly important given the well publicized tendency of many types of ATVs to roll over on their occupants due to excessive speed and/or steep slopes.

Having thereby described the subject matter of this invention it should be apparent that many substitutions, modifications and variations of the apparatus are possible in light of the above teachings. It is therefore to be understood that the invention as taught and described herein is only to be limited to the extend of the breadth and scope of the appended claims.

I claim:

1. A collapsible tower apparatus in combination with an all terrain vehicle including a vehicle body equipped with front and rear rack members wherein the collapsible tower apparatus comprises:

a framework unit comprising a front framework segment and a rear framework segment; wherein, each of said framework segments comprise a pair of elongated leg members operatively connected together by a plurality of cross-piece members and the lower portion of the elongated leg members are adapted to be pivotally connected to the front and rear rack members of the all terrain vehicle; and, a platform unit comprising a generally rectangular platform member that is adapted to be pivotally connected to the upper portion of said front and rear framework segments.

2. The collapsible tower apparatus as in claim 1, further comprising:

a seat unit operatively associated with said platform unit.

3. The collapsible tower apparatus as in claim 2; wherein, the seat unit comprises:

a seat member mounted for relative rotation on a pedestal element; wherein, the pedestal element is operatively connected to the platform member; and, a restraining means operatively connected to said seat member to restrict the relative rotation between said seat member and said platform member.

4. The collapsible tower apparatus as in claim 1; wherein, said plurality of cross-piece members on a selected one of said framework segments comprise:

a plurality of horizontally disposed cross-piece members which serve as steps to said platform member.

5. The collapsible tower apparatus as in claim 1; wherein, said plurality of cross-piece members on a selected one of said framework segments comprise a plurality of intersecting cross-piece members that are disposed proximate the top of the selected framework segment.

6. The collapsible tower apparatus as in claim 1; wherein, said platform member is provided with a leveling means.

7. The collapsible tower apparatus as in claim 1; wherein, the front and rear framework segments in conjunction with the platform member form a protective cage for the operator of the all terrain vehicle when the tower apparatus is disposed in its collapsed mode.

* * * * *